Sept. 29, 1959  O. H. NESTOR  2,906,857

GAS SHIELDED ARC CLEANING

Filed Aug. 9, 1954

INVENTOR
ONTARIO H. NESTOR
BY
Richard S. Shreve Jr.
ATTORNEY

United States Patent Office 2,906,857
Patented Sept. 29, 1959

2,906,857

GAS SHIELDED ARC CLEANING

Ontario H. Nestor, Kenmore, N.Y., assignor to Union Carbide Corporation, a corporation of New York Application August 9, 1954, Serial No. 448,407

6 Claims. (Cl. 219—121)

This invention relates to gas shielded arc welding with a non-consumable electrode connected to a source of welding current wherein an arc is struck between the electrode and a metal workpiece connected to said source, a stream of gaseous medium is simultaneously fed to shield the arc, and portions of the workpiece are melted to form a weld puddle.

Heretofore the electrode has generally been of tungsten, the shielding gas has generally been monatomic, such as argon or helium, and the welding current has generally been straight polarity, that is with the electrode negative, because the current carrying capacity of conventional tungsten electrodes is substantially less with reverse polarity than with straight polarity, and because in the current range in which conventional tungsten electrodes are usable weld penetration is greater on straight polarity than on reverse polarity. In welding aluminum and magnesium, however, reverse polarity produces a desirable cleaning action on the weld surface. For these metals alternating current has been used to obtain penetration on the straight polarity portion of the alternating cycle and to obtain cleaning action on the reverse polarity portion of the alternating cycle.

Using straight polarity the tungsten electrode being the arc cathode is heated by ion bombardment to temperatures where thermionic emission can be supported. In the reverse polarity case the tungsten electrode is heated by electron bombardment to similarly high temperatures, but electric fields prevent electron escape so that the cooling mechanism provided by thermionic emission is not present. Hence large electrode diameter is required with reverse polarity to prevent exessive melting. For example, in argon the maximum operative current carrying capacity of ¼ inch diameter tungsten electrode is 125 amperes for reverse polarity in which the tungsten rod is the anode, as compared with 1000 amperes with straight polarity in which the tungsten rod is the cathode. Prior to this invention high current reverse polarity welding with a non-consumable electrode was virtually prohibited by the need for larger diameter electrodes. Not only was this disadvantageous per se but arc instability would also occur.

It is therefore an object of the present invention to provide a method of and apparatus for inert gas shielded arc welding with a non-consumable electrode and high current reverse polarity without excessively large electrodes.

Another object of the present invention is to provide an improved method of inert gas shielded arc welding of aluminum and similar metals with a non-consumable electrode and high current reverse polarity power while maintaining electrodes of convenient diameter and eliminating the need for high-frequency stabilization during welding.

There is no known arc-sustaining mechanism requiring the arc anode to be at an elevated temperature. Whereas anode heating does occur as a natural consequence of arc action and evaporation of the electrode introduces vapors of the electrode material into the arc plasma, there are no vital mechanisms sustaining the welding arc which depend on those effects. In short, a hot positive electrode is not required for the existence of the arc. Accordingly, it was conceived that an arc would operate with the anode cooled to an arbitrary temperature with only secondary changes in arc properties. This principle permitted freedom of selection of the anode material in reverse polarity arc processes. The material must be an electrical conductor. It is desirable that it have a high melting point and high thermal conductivity. Because electron condensation is an important anode heating mechanism and the heat of condensation is proportional to the work function of the anode material, it is desirable that the anode material have a low work function. Whereas the aforementioned properties of the anode material are desirable, it will be apparent that they are not intended to be restrictive. On the contrary it is an object of the present invention to teach how an electrode of a given conductive material, whatever its properties, can be designed to have a given current carrying capacity for a minimal diameter.

As distinguished from the tungsten arc welding with a shielding gas, advances have been obtained in the metal arc process, in which a wire electrode is fed to the shielded arc and known as the sigma process, by substituting for part or all of the argon or helium other gases having more active constituents, such as oxygen, carbon dioxide and additives such as silicon tetrachloride. These more active gases cannot be used with the tungsten electrode because they attack and deteriorate the electrode and cause excessive loss of tungsten. It is therefore a further object of the present invention to replace the tungsten with a metal resistant to attack by active shielding gases where these gases prohibit the use of tungsten.

The present invention is characterized by employing a welding current having a reverse polarity component, employing as the anode a hollow electrode the arcing tip of which is of a non-refractory metal having a high product of thermal conductivity and melting point, and during the welding operation continuously feeding cooling medium axially into the hollow of said electrode to a point near its arcing tip. The metal of the electrode tip is preferably copper or alloys thereof, but other conductive metals such as silver, or gold, or alloys thereof, may be used. The shielding gas is preferably oxy-argon, such as 0.1–5 percent mixture of oxygen in argon but all shielding gases and mixtures which have been proposed hereinbefore may be used.

Figure 1:
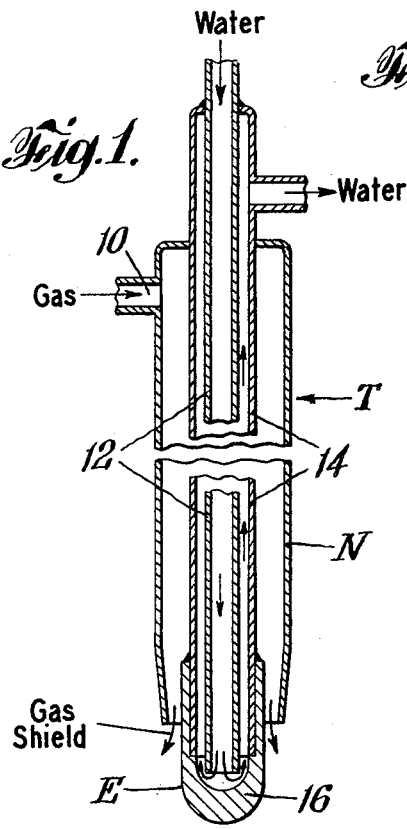
Fig. 1 is a diagrammatic cross section of one embodiment of a torch for carrying out the method according to the present invention.

In the apparatus shown in Fig. 1, the torch T comprises an electrode E and a gas cup or nozzle N. Shielding gas is supplied to the nozzle N at the inlet 10 and flows in an annular stream down around the electrode E and out through the nozzle orifice, to shield the arc and molten portions of the workpiece.

The electrode E comprises an inner inlet tube 12 and and an outer outlet tube 14 mounted in concentric relation. In the form shown an electrode tip 16 closes the lower end of the outer outlet 14 so that water flowing down the inlet tube 12 is reversed and flows up in an annular stream within the outer outlet tube 14. The tubes 12 and 14 are preferably of copper or an alloy thereof and tip 16 is also preferably of copper or an alloy thereof.

Figure 2:
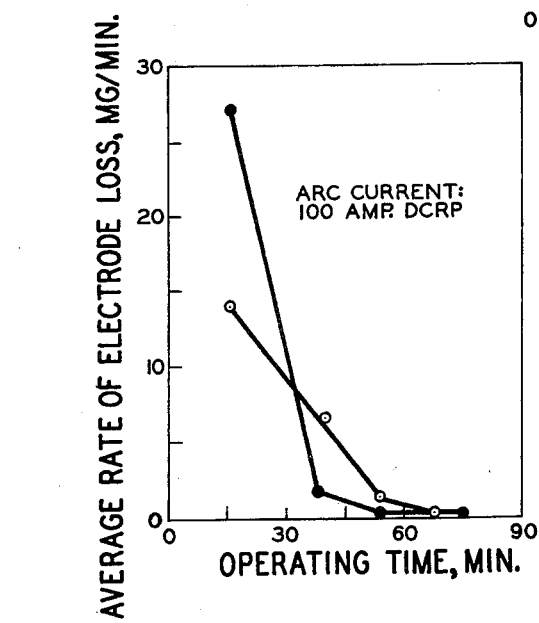
Fig. 2 is a curve of rate of loss of metal plotted against time.

In practice it has been found convenient also to construct the tip of oversized length for a given current so that heat is not conducted to the cooling water sufficiently rapidly to prevent excessive melting in which case the tip adjusts itself by losing metal to achieve equilibrium. This is illustrated in Fig. 2, where the average rate of loss of metal is plotted as a function of time for two different electrode geometries.

Electrodes have been designed according to the above principles and operated successfully. Stable reverse polarity arcs of 200 amperes were maintained on aluminum and stainless steel blocks using a 0.3-inch diameter copper water-cooled electrode tip, and of 300 amperes using a 5/16-inch electrode tip diameter. Using argon shielding and a water-cooled copper electrode tip excellent bead and butt welds were made at 90 i.p.m. on 16 gauge aluminum using 160 amperes reverse polarity and at 55 i.p.m. on 16 gauge Everdur using 150 amperes reverse polarity. Tests with water-cooled copper electrodes on mild steel and aluminum with shielding gas 93.1 percent argon, 4.9 percent oxygen and 2.0 percent nitrogen showed no visible electrode loss.

Welding tests were made with water-cooled copper tip and the following shielding gases: argon plus 5 percent oxygen, various mixtures of argon plus carbon dioxide, pure carbon dioxide and ternary mixtures of argon plus helium plus oxygen or carbon dioxide. There was no difficulty of excessive electrode deterioration. The weld beads were made on aluminum, steel and stainless steel. Typical data are summarized below. The weld beads on steel and stainless steel were made with an arc current of 300 amperes D.C.R.P. at a speed of 25 inches per minute on 1/8 and 3/16 inch material, respectively. The beads on 1/4 inch thick aluminum were made at 50 inches per minute. Shielding gas consumption was 60 c.f.h.

120 i.p.m. on 16 gauge aluminum using 180 amperes reverse polarity, argon plus 0.12 percent oxygen and a water-cooled copper electrode. Bead and butt welds were made also at 23 i.p.m. on 1/4-inch thickness aluminum using 280 amperes reverse polarity, argon plus 0.12 percent oxygen and a water-cooled copper electrode.

Figure 3:
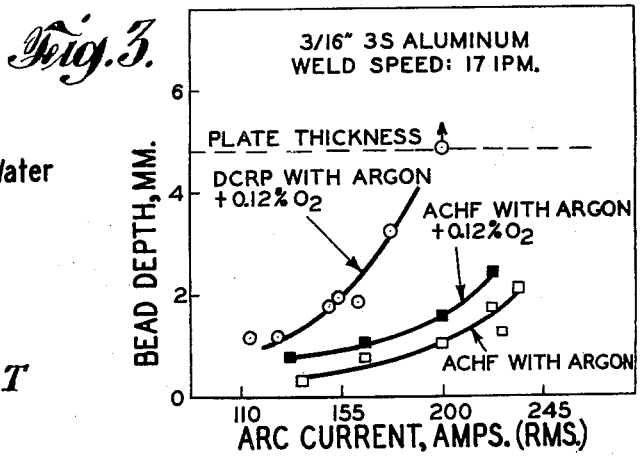
Fig. 3 is a chart showing curves of bead depth vs. arc current for the method of the present invention when used on aluminum and as compared to the conventional method of tungsten arc welding of aluminum.
Figure 4:
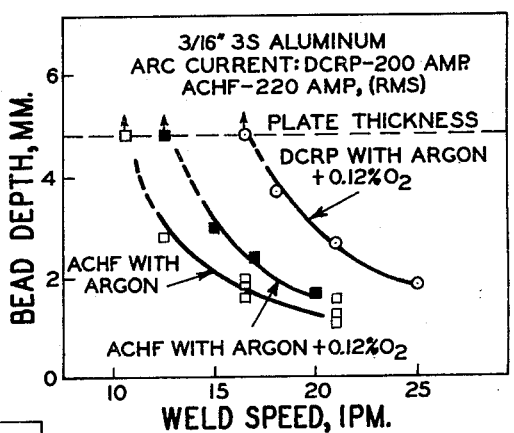
Fig. 4 is a curve of bead depth vs. welding speed for the method of the present invention when used on aluminum and as compared to the conventional method of tungsten arc welding on aluminum.

In the course of this work an unexpected result was obtained, viz. that on aluminum welding at currents above approximately 100 amperes, penetration with reverse polarity and with argon plus 0.12 percent oxygen exceeded that with the method of alternating current wherein a thoriated-tungsten electrode and either argon or argon plus 0.12 percent oxygen was used. These data are shown in Figs. 3 and 4. There was no visible loss of the thoriated tungsten electrode when the shielding medium was argon plus 0.12 percent oxygen. A similar result was observed when tungsten electrodes were used. The weld beads with reverse polarity were smoother than with alternating current and high frequency was not required with reverse polarity current. High frequency was required with alternating current to re-establish the arc as is usually the practice.

It is evident that the principal contribution of the methods of the present invention to the unexpected results shown in Figs. 3 and 4 is the use of water-cooled electrodes which permits operation at higher reverse polarity currents than heretofore practiced. A minor but nevertheless important contribution to these results is the use of small oxygen addition in the argon shielding medium which improves arc stability.

I claim:

1. Method of gas shielded arc cleaning with a nonconsumable electrode connected to a source of cleaning current wherein an arc is struck between said electrode and a cleaning zone on a metal workpiece connected to said source, and a stream of gaseous medium is simultaneously fed to shield the arc; characterized by employing a high current reverse polarity cleaning current hav-

| Shielding Gas Base Metal | Arc Stability | | | Bead Penetration, Inches | | | Bead Surface | | |
|---|---|---|---|---|---|---|---|---|---|
| | Al | Steel | Stainless | Al | Steel | Stainless | Al | Steel | Stainless |
| Argon | Good | Poor | (1) | 0.06 | 0.02 | (1) | Good | Fair | (1). |
| Carbon Dioxide | Poor | do | Poor | (2) | (2) | (2) | Poor | Poor [3] | Poor. |
| Helium | (1) | do | (1) | (1) | (2) | (1) | (1) | (2) | (1). |
| A+5% O₂ | Very Good | Very Good | Very Good | 0.08 | 0.06 | 0.09 | Good | Good | Good. |
| A+5% CO₂ | Fairly Good | Good | do | 0.14 | 0.05 | 0.06 | Fair | Good [3] | Do. |
| A+50% CO₂ | Fair | Fair | Fair | 0.11 | 0.12 | 0.11 | Poor | Poor [3] | Do. |
| A+50% He+5% O₂ | (1) | Good | Very Good | (1) | 0.07 | 0.09 | (1) | do | Do. |

[1] Not tested.
[2] Bead quality too poor for measurement.
[3] Porosity observed.

It is evident that arc stability using the water-cooled electrode with D.C.R.P. current is best in sigma argon, argon plus 5 percent carbon dioxide and the ternary mixture of 45 percent argon, 50 percent helium, 5 percent oxygen. In addition, the data indicate considerable increase in penetration and some improvement in surface can be obtained by adding small amounts (5 percent) of oxygen or carbon dioxide to argon in welding aluminum, steel and stainless steel.

In certain applications it is essential that aluminum weldments have a wide cleaned zone along both edges of the bead proper. Such a cleaned zone is obtainable with reverse polarity and with argon shielding. The use of oxygen additions to the shielding argon improves arc stability but too great oxygen addition, i.e. 5%, produces some surface blackening which would be objectionable in certain applications. We have found that reduction of the oxygen content to as low as 0.1% oxygen does not noticeably impair the stabilizing effect on aluminum and that in the range 0.1%–0.4% oxygen there is a wide cleaned zone. Bead and butt welds have been made at ing a continuous cleaning action on said cleaning zone, employing as the anode reverse polarity current, employing as the anode a hollow electrode having an arcing tip metal having high product of thermal conductivity and melting point, during the cleaning operation continuously feeding cooling medium into the hollow of said electrode to a point near its arcing tip the thickness of the metal of said arcing tip being substantially in equilibrium between the cooling effect of said fluid and the melting off effect of said high current density reverse polarity current on said arcing tip, and continuously relatively progressing said continuously cooled anode with its tip in said state of equilibrium, together with said reverse polarity arc, said stream of shielding gas, and said continuously cleaned zone, all with respect to and along a line of operation on said workpiece.

2. Method of gas shielded arc cleaning with a nonconsumable electrode connected to a source of cleaning current wherein an arc is struck between said electrode and a cleaning zone on a metal workpiece connected to said source, and a stream of gaseous medium is simultaneously fed to shield the arc, characterized by employing a cleaning current having a reverse polarity component having a continuous cleaning action on said cleaning zone, employing as the anode a reverse polarity component, employing as the anode a hollow electrode of a metal of the group consisting of copper and its alloys the diameter of said anode adjacent its arcing tip being less than about five sixteenths of an inch, during the cleaning operation continuously feeding cooling medium into the hollow of said electrode to a point near its arcing tip the thickness of the metal of said arcing tip being substantially in equilibrium between the cooling effect of said fluid and the melting off effect of said reverse polarity component of said cleaning current, and continuously relatively progressing said continuously cooled anode with its tip in said state of equilibrium, together with said reverse polarity component arc, said stream of shielding gas, and said continuously cleaned zone, all with respect to and along a line of operation on said workpiece.

3. Method of gas shielded arc welding with a non-consumable electrode connected to a source of welding current wherein an arc is struck between said electrode and a metal workpiece connected to said source, and a stream of gaseous medium is simultaneously fed to shield the arc, and portions of the workpiece are melted to form a weld puddle; characterized by employing as the anode a hollow electrode having an arcing tip of a metal having a high product of thermal conductivity and melting point, employing a high current density reverse polarity welding current having a continuous cleaning action on said welding puddle, during the welding operation continuously feeding cooling fluid into the hollow of said electrode to a point near its arcing tip, the thickness of the metal of said arcing tip being in equilibrium between the cooling effect of said fluid and the melting off effect of said high current density reverse-polarity welding current on said arcing tip, and continuously progressing said continuously cooled anode with its tip in said state of equilibrium, together with said reverse polarity arc, said stream of shielding gas, and said continuously cleaned welding puddle along a line of weld.

4. Method of gas shielded arc cleaning with a non-consumable electrode connected to a source of cleaning current wherein an arc is struck between said electrode and a cleaning zone on a metal workpiece connected to said source, and a stream of gaseous medium is simultaneously fed to shield the arc, characterized by employing a workpiece containing a metal of the group consisting of aluminum and magnesium, employing as the anode a hollow electrode having an arcing tip of a metal having a high product of thermal conductivity and melting point, employing a high current reverse polarity cleaning current having a continuous cleaning action on said zone, during the cleaning operation continuously feeding cooling fluid into the hollow of said electrode to a point near its arcing tip, the thickness of the metal of said arcing tip being substantially in equilibrium between the cooling effect of said fluid and the melting off effect of said high current density reverse polarity welding current on said arcing tip, and continuously progressing said continuously cooled anode with its tip in said state of substantial equilibrium, together with said reverse polarity arc, said stream of shielding gas, and said continuously cleaned zone relative to and along a line of operation on said workpiece.

5. Method of gas shielded arc cleaning with an electrode connected to a source of cleaning current wherein an arc is struck between said electrode and a cleaning zone on a metal workpiece connected to said source, and a stream of gaseous medium is simultaneously fed to shield the arc, characterized by employing a workpiece containing essentially aluminum, employing as the shielding gas argon containing from 0.10 to 0.50 percent of oxygen employing as the anode a hollow electrode having an arcing tip of a metal having a high product of thermal conductivity and melting point, employing as the cleaning current at least a component of reverse polarity having a continuous cleaning action on said aluminum cleaning zone, during the arc cleaning operation, continuously feeding cooling fluid into the hollow of said electrode to a point near its arcing tip, the thickness of the metal of said arcing tip being in equilibrium between the cooling effect of said fluid and the melting off effect of said high density reverse polarity current on said arcing tip, and continuously relatively progressing said continuously cooled anode with its tip in said state of equilibrium together with said reverse polarity arc, said stream of oxygen containing argon, and said continuously cleaned zone relative to and along a line of operation on said aluminum workpiece at higher speeds permitted by said oxygen content of the shielding gas.

6. Method of gas shielded arc welding which comprises employing as the anode a hollow electrode connected to a source of welding current and having a non-consumable arcing tip of a metal having a high product of thermal conductivity and melting point; employing as the cathode connected to said source a workpiece of a metal for the welding of which the cleaning action of reverse polarity on the welding surface is desirable; striking a reverse polarity arc between said non-consumable arcing tip and said metal workpiece; continuously feeding cooling fluid into the hollow of said electrode to a point near its non-consumable arcing tip; continuously feeding a stream of gaseous medium along said hollow electrode to shield said reverse polarity arc; continuously supplying direct current from said source to said non-consumable anode and said workpiece cathode at reversed polarity until an equilibrium is reached between the cooling effect of said fluid and the melting off effect of said high density reverse polarity current on said non-consumable arcing tip, portions of said workpiece are melted to form a weld puddle, and continuous cleaning action is produced by the reverse polarity arc on said weld puddle; and thereafter continuously progressing said continuously cooled electrode with its tip in said state of equilibrium, said continuously shielded reverse polarity arc, and said continuously cleaned weld puddle all together along a line of weld.

References Cited in the file of this patent

UNITED STATES PATENTS

| | | |
|---|---|---|
| 2,052,796 | Rava | Sept. 1, 1936 |
| 2,053,417 | Brace | Sept. 8, 1936 |
| 2,273,819 | Cooke et al. | Feb. 24, 1942 |
| 2,370,467 | Hopkins | Feb. 27, 1945 |
| 2,446,929 | Hopkins | Aug. 10, 1948 |
| 2,587,331 | Jordan | Feb. 26, 1952 |
| 2,646,492 | Ballard | July 21, 1953 |

FOREIGN PATENTS

| | | |
|---|---|---|
| 415,590 | Italy | Oct. 21, 1946 |
| 509,027 | Belgium | July 17, 1953 |
| 709,533 | Great Britain | May 26, 1954 |

OTHER REFERENCES

Welding Journal, March 1940, pages 110-S to 116-S.

UNITED STATES PATENT OFFICE
CERTIFICATE OF CORRECTION

Patent No. 2,906,857                                               September 29, 1959

Ontario H. Nestor

It is hereby certified that error appears in the printed specification of the above numbered patent requiring correction and that the said Letters Patent should read as corrected below.

Column 1, line 33, for "alterminating" read -- alternating --; line 45, for "exessive" read -- excessive --; column 4, lines 56 and 57, strike out "as the anode reverse polarity current, employing"; column 5, lines 4 and 5, strike out "a reverse polarity component, employing as an anode".

Signed and sealed this 5th day of April 1960.

(SEAL)
Attest:

KARL H. AXLINE                                          ROBERT C. WATSON
Attesting Officer                                      Commissioner of Patents